United States Patent [19]

Rees et al.

[11] 4,244,649

[45] Jan. 13, 1981

[54] OPTICAL SYSTEM FOR PROVIDING VISUAL AID FOR PROPER MAGNIFICATION SELECTION

[75] Inventors: James D. Rees, Pittsford; David N. Redden, Penfield; Craig A. Smith, Pittsford; Paul H. Stiebitz, Rochester, all of N.Y.

[73] Assignee: Xerox Corporation, Stamford, Conn.

[21] Appl. No.: 41,850

[22] Filed: May 24, 1979

[51] Int. Cl.³ .............................................. G03B 27/52
[52] U.S. Cl. ......................................... 355/61; 355/44
[58] Field of Search ....................... 355/61, 59, 62, 43, 355/45, 28, 40, 44, 7

[56] References Cited

U.S. PATENT DOCUMENTS

| | | | |
|---|---|---|---|
| 2,095,815 | 10/1937 | Hopkins | 355/62 X |
| 3,395,610 | 8/1968 | Evans et al. | 355/28 X |
| 3,848,996 | 11/1974 | Goding | 355/45 X |
| 4,105,327 | 8/1978 | Gibson et al. | 355/59 |

Primary Examiner—Richard A. Wintercorn

[57] ABSTRACT

In a full-frame, copying system, translucent registration guides along the edges of a platen area provide an operator with an indication of which portion of a document overlying the platen will be copied onto selected copy paper at the particular magnification ratio selected. Illumination sources located on the image side of a projection lens create line images which are projected through the lens to illuminate appropriate registration guides corresponding with the particular magnification ratio.

9 Claims, 3 Drawing Figures

OPTICAL SYSTEM FOR PROVIDING VISUAL AID FOR PROPER MAGNIFICATION SELECTION

BACKGROUND AND PRIOR ART STATEMENT

The present invention relates to office photocopiers and more particularly to copiers having magnification capabilities. In this type of system it is obviously important for an operator to determine if the entire document to be copied will in fact, be copied onto the particular copy paper at the selected magnification setting. One solution to this problem is to use a framing indicator of the type described in U.S. Pat. No. 3,395,610; especially FIGS. 13 and 16. This solution is rather complex requiring a plurality of belts and pulleys which are coupled to the linkage which in turn adjusts the optical system. U.S. Pat. No. 4,105,327 also discloses a movable framing indicator which can be moved by the operator to a placement defined by the optical system.

There is still required in a variable magnification system some mechanism to automatically and simply predefine for an operator which areas of the platen will be copied in the particular magnification mode he has selected.

SUMMARY OF THE INVENTION

In a full-frame copying system having magnification capabilities an optical system is designed to ease operator selection of correct magnification ratio for the document to be copied. A platen is provided having translucent edge registration guides. The guides are illuminated by a line image projected through the projection lens from the image side of the lens. The illuminated guides serve to provide a visual frame of reference indicating to an operator those portions of a document which will be copied at the selected magnification. The position of the projected line image is made to vary in response to changes in the optical projection.

DESCRIPTION OF THE INVENTION

Figure 1:
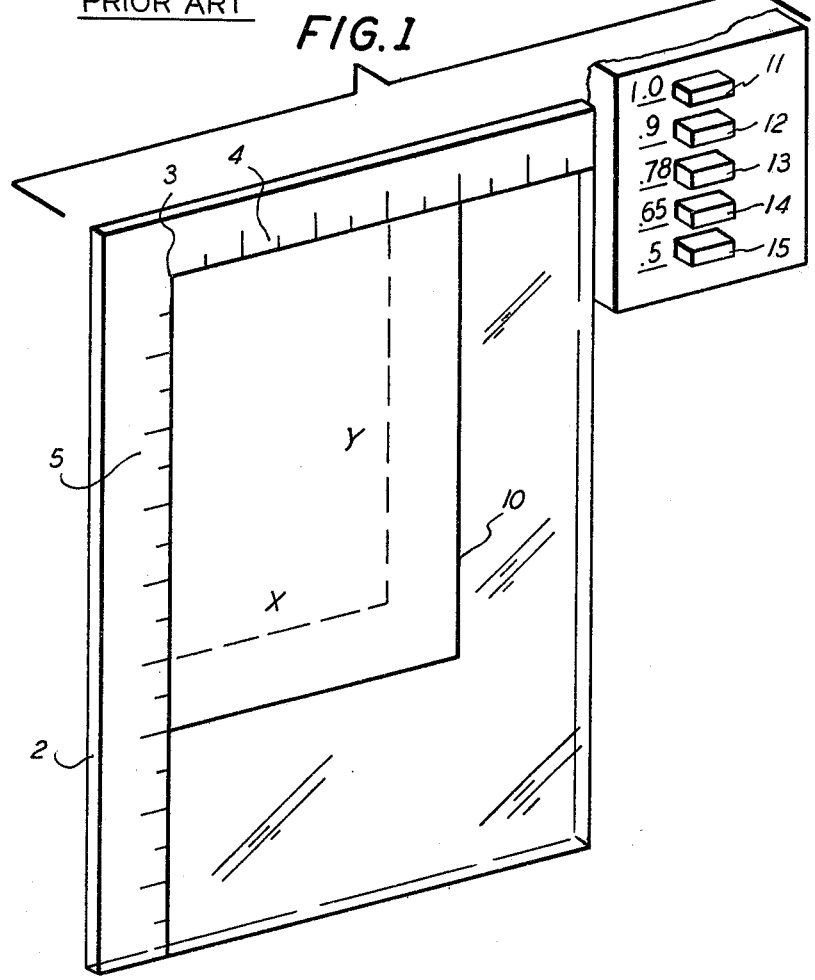
FIG. 1 shows a prior art document platen.

The problem facing a casual operator using a full-frame copier with a reduction feature is illustrated in FIG. 1. FIG. 1 shows a platen 2 of a photocopier (not shown) with registration at a corner 3. A plurality of registration guide markers 4 and 5 provide fixed reference points for placement of a document. An assumption is made that a job calls for reduction of a legal size ($11 \times 14$) document 10 onto an $8\frac{1}{2} \times 11$ copy sheet. The particular machine has a 1:1 and four reduction modes represented by buttons 11-15. The operator is uncertain as to which mode would be most appropriate for the desired reduction. The assumption is further made that as a guess the operator selects button 12 which represents a 0.9x reduction and makes a first copy at this reduction. Upon examining the copy the operator determines that the area of document 10 bounded by dotted lines xy was copied while the area outside this boundry was lost. A still further reduction represented by one of the remaining buttons 13-15 must be selected and a second copy produced and checked. This procedure must be repeated until the full document is reduced within the area of the $8\frac{1}{2} \times 11$ inch copy paper.

Figure 2:
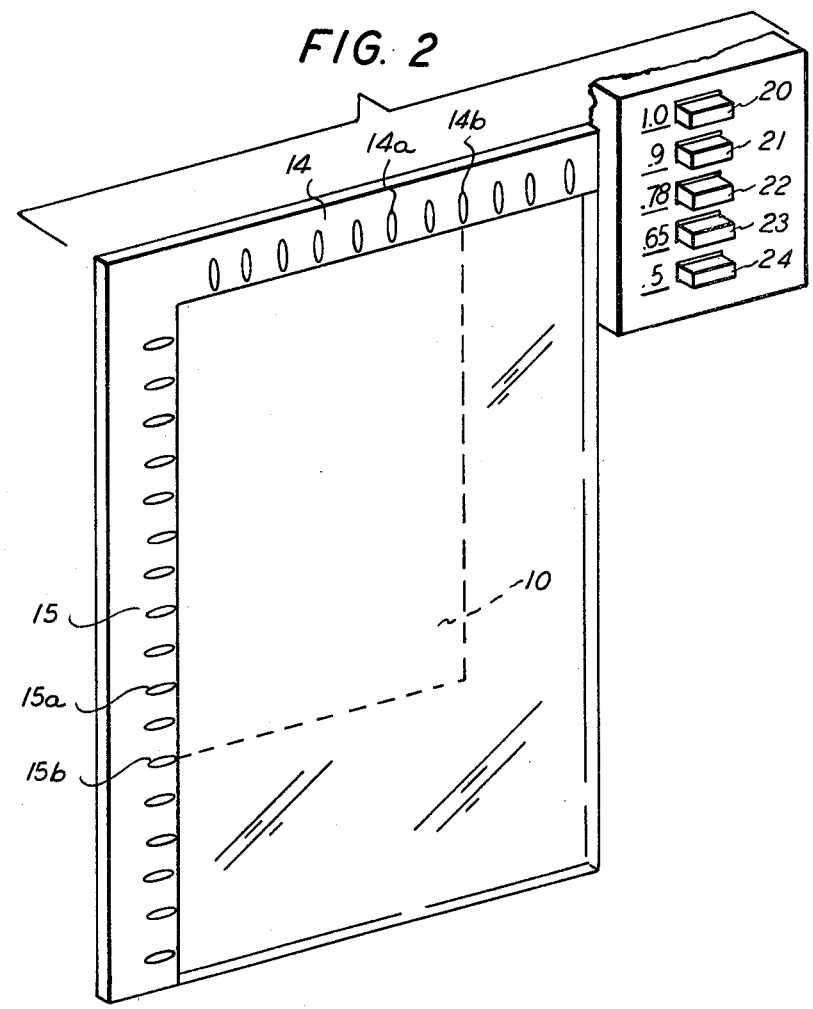
FIG. 2 shows a document platen modified according to the present invention to include translucent registration guides arranged along two sides.

FIG. 2 shows the same platen and reduction module of FIG. 1 but modified in accordance with the invention. Buttons 20-24 represent the magnification mode. Unlike the embodiment of FIG. 1, registration guides 14 and 15 are shown as discrete translucent segments although other guide configurations are possible as described below. The casual operator faced with the same task as before would proceed as follows. Button 21 representing the 0.9x reduction is depressed. Registration guides 14a 15a become illuminated and begin to pulse for reasons to be discussed more fully below. Guides 14a, 15a represent the dimensions of a document which can be completely copied at the 0.9x reduction onto the selected $8\frac{1}{2} \times 11$ document and corresponds to the area bounded by xy of FIG. 1. But in this case, instead of making a copy to determine whether the reduction ratio selected is the proper one, the operator merely takes the $11 \times 14$ document and places it onto the platen. The operator can then make the visual observation that a portion of document 10 extends beyond illuminated guide 14a and below guide 15a. The next reduction mode represented by button 22 is then depressed. For this reduction guides 14b, 15b become illuminated and begin to pulse while guides 14a, 15a return to their normal unilluminated state. The operator then perceives that at this reduction document 10 will completely be contained within the copy paper. The copying operation can then proceed in a normal fashion.

It is thus apparent that to a casual operator the choice of which reduction to use is greatly simplified, involving the successive testing of the reduction modes until the appropriate document area is encompassed within the frame border visualized by extension of the pulsating guides. Trial by generating unwanted copies is completely eliminated.

While the registration guides shown in FIG. 2 consisted of fairly widely separated discrete segments, the guides may, of course, be greater in number and positioned closer to each other. Alternatively, fewer guides may be used, chosen to correspond only to particular paper sizes.

Figure 3:
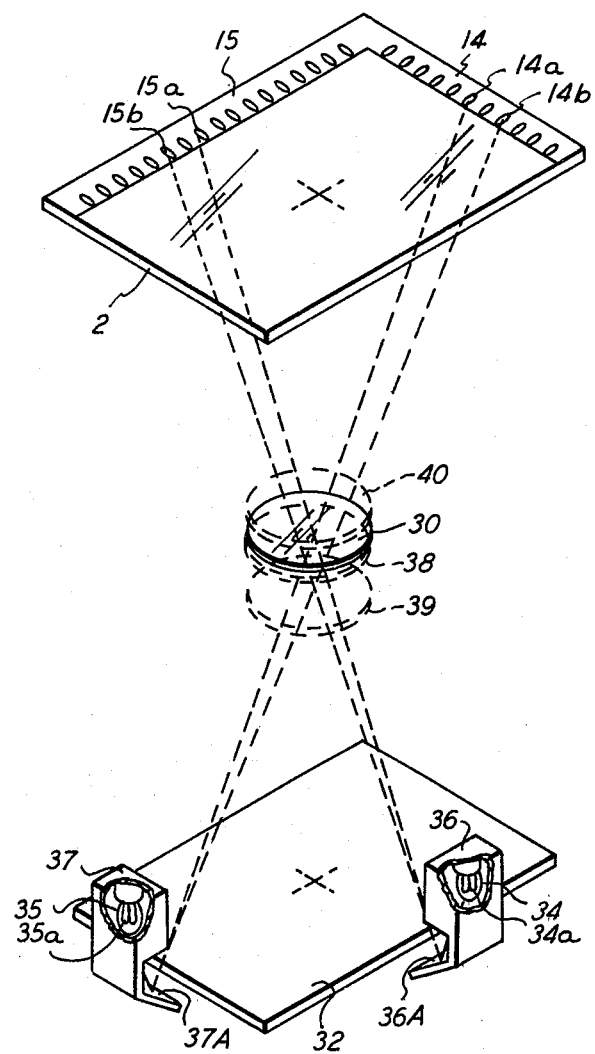
FIG. 3 is a prospective view of the imaging system of the present invention at four different magnification positions showing the positioning of two illumination sources which provide line images for projection and focusing through the lens.

FIG. 3 illustrates one embodiment of an optical system designed to create the condition of pulsating illuminated guidelines shown in FIG. 2. As shown in FIG. 3, optical lens 30, which can be a conventional zoom lens containing a plurality of lens elements (not shown) projects an image of the document to be copied onto photoreceptor imaging plane 32. Tungsten lamps 34, 35, partially enclosed by shield members 36, 37, respectively, are located in a fixed position beneath the lens and towards the outer field angles of the lens. The lamps are pulsed by appropriate circuitry (not shown) so that the lamp filaments 34a, 35a become alternately brighter, then darker.

Assuming again that the magnification ratio of 0.9x has been selected by the operator, the lens 30 would be translated along a line defined by a principal ray joining the platen registration corners and its projected image on the image plane to the first dotted position 38 to change magnification in accordance with the relationship Magnification = S'/S where S = object distance and S' = image distance.

Compensation is then made within the zoom lens to refocus the lens in accordance with the following relationship:

$$(1/S) + (1/S') = 1/f$$

where f = lens focal length. The compensation in focal length is generally made by movement of one or more of the lens elements within lens 30. The lamp filaments 34a, 35a are reflected from a specular area 36A, 37A, respectively, such that the apparent position of the imaging filament is coplanar with the imaging plane 32. The reflected images are projected through lens 30 at position 38 and focused onto registration guides 14a, 15a, respectively. As described in the description of FIG. 2 above, translucent guides 14a, 15a will become illuminated in a pulsating manner consistent with the pulsating filaments 34a, 34b. As previously indicated, the operator has realized that this reduction ratio is inappropriate for the document to be reduced so the next reduction button 22 is depressed, selecting the 0.78x rate and translating the lens to position 39. Again, the zoom lens adjusts for focal length and the pulsating image of filaments 34a, and 35a are projected through lens 30 and focused onto registration guides 14b, 15b. As previously indicated, this is the correct ratio and the print operation is initiated. The lamps 34, 35 should be effectively turned off at this point to avoid stray light in the document images on the photoreceptor. The lamps should not be completely turned off, however, to avoid thermal shock to them. Shield members 36, 37 prevent stray light from fatiging the photoreceptor during lamp operation.

The above principles will be valid for situations requiring enlargement as well. For example, if it is assumed that one wishes to know what size documents can be magnified at a 1.5x ratio and be copied onto an 8½×11 inch copy sheet, the 1.5x copy enlargement mechanism would be activated. In this case lens 30 would be translated away from the photoreceptor to a new position 40 and the focal length adjusted accordingly. In this case, registration guides corresponding to the 5.66×7.33 position would be pulsatingly illuminated, indicating documents this size or below could be copied at that magnification onto the copy sheet.

In the foregoing examples, the lamps were calibrated at a 1x magnification position so that the guides associated with 8½×11 copy sheet would be illuminated. If copy paper of other sizes, i.e., 11×14; 8.27×11.69 (A3) were used, the lamps would be calibrated appropriately at 1x. It is obvious that one of the advantages of the invention is that various sizes of copy paper can be accommodated.

The preceding examples were also described in terms of selection of one of several reduction modes for simplicity of description. The concepts of the present invention, however, are even more appropriate for systems whereby reduction and/or enlargement are achieved by means of a continuous magnification mode permitting any setting between some upper magnification and lower reduction range. In a continuous magnification mode, the registration guides could be continuous translucent panels which could become illuminated at any point along its entire length.

While a zoom lens is disclosed in the optical system of FIG. 3, other means for obtaining required change of image conjugate and focal length can be employed. For example, an add-on lens may be employed with a single lens as described in U.S. Pat. No. 3,476,478. Conjugate length could be changed by varying platen and/or imaging plane distances vis-a-vis the lens.

Although the operative principles herein described have described the imaged registration guides as illuminating and pulsating, the guides need not pulsate to successfully practice the inventive concepts described herein. In other words, if the guides were only illuminated there would still be sufficient contrast between the non-illuminated guides for the operator to make the proper selection. Pulsing the line does make the filament image more apparent to the operator, however, and has the added advantage of allowing the lamps to be operated at higher brightness for a desired given lifetime.

While the illumination source used to image the document has not been discussed in detail, it is obvious that any type of illumination which provides full exposure of the document may be utilized, i.e. flash; quasi-flash. And while the invention is most applicable to corner registration systems, it may also be used in systems using edge registration.

Another advantage to use of the above disclosed system is the absence of mechanisms or wiring on or in the vicinity of the platen, facilitating, for example, the attachment of document handling accessories to the platen.

What is claimed is:

1. In a full-frame copying system having magnification capabilities, an optical system which includes means for selecting appropriate magnification ratios for projection of a document onto selected size copy sheets comprising:
   a platen for supporting the document to be copied, said platen having a translucent registration guide along two registration edges;
   means for projecting an image of said document onto an image plane;
   means for varying the magnification of said projected image; and
   means on the image side of said projecting means for creating line images at said image plane and transmitting said images through said projection means onto said registration guides, the location of said line images varying in response to said magnification variance whereby the position of said line pairs on said guides provides a visual indication of the dimensions of a document which can be copied onto the copy sheet in use at the instant magnification.

2. The system of claim 1 wherein said means for creating line images are a pair of filament type lamps, each lamp providing an apparent image of said filament at the image plane, said image being transmitted through said projection means onto said registration guides.

3. The system of claim 1 or 2 wherein said projection means is a zoom lens.

4. The system of claim 1 or 2 wherein said line images are pulsating.

5. The system of claim 1 wherein said magnification varying means provides a continuous magnification change.

6. The system of claim 1 and wherein said registration guides are continuous panel-type strips.

7. The system of claim 1 or 2 wherein said registration guides comprise a plurality of discrete guide marks.

8. The system of claim 1 or 2 wherein said projection means is translated along a line defined by a principal ray joining the platen registration corners and its projected image on the image plane.

9. The system of claim 1 wherein said document is corner registered.

* * * * *